United States Patent
Gross et al.

(10) Patent No.: US 12,552,287 B2
(45) Date of Patent: Feb. 17, 2026

(54) SYSTEMS AND METHODS FOR AUTONOMOUS VEHICLE BATTERY DELIVERY AND ELECTRIC VEHICLE ROUTING

(71) Applicant: STATE FARM MUTUAL AUTOMOBILE INSURANCE COMPANY, Bloomington, IL (US)

(72) Inventors: Ryan Michael Gross, Normal, IL (US); Matthew S. Megyese, Bloomington, IL (US); Joseph P. Harr, Bloomington, IL (US); Scott Thomas Christensen, Salem, OR (US); Vicki King, Bloomington, IL (US); Shawn Renee Harbaugh, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 74 days.

(21) Appl. No.: 17/947,677

(22) Filed: Sep. 19, 2022

(65) Prior Publication Data

US 2023/0399024 A1    Dec. 14, 2023

Related U.S. Application Data

(60) Provisional application No. 63/353,081, filed on Jun. 17, 2022, provisional application No. 63/350,979, filed on Jun. 10, 2022.

(51) Int. Cl.
*B60L 58/13* (2019.01)
*B60L 53/36* (2019.01)
(Continued)

(52) U.S. Cl.
CPC ............... *B60L 58/13* (2019.02); *B60L 53/36* (2019.02); *B60L 53/53* (2019.02); *B60L 58/16* (2019.02);
(Continued)

(58) Field of Classification Search
CPC ............... B60L 58/16; B60W 60/0023; B60W 2510/18; G01C 21/3461; G01C 21/3469
See application file for complete search history.

(56) References Cited

U.S. PATENT DOCUMENTS

| | | |
|---|---|---|
| 6,814,170 B2 | 11/2004 | Abe et al. |
| 9,266,529 B2 | 2/2016 | Dufford |

(Continued)

FOREIGN PATENT DOCUMENTS

| | | |
|---|---|---|
| EP | 3239686 A1 | 11/2017 |
| EP | 3578433 B1 | 8/2020 |

(Continued)

OTHER PUBLICATIONS

Doll, S., "Ford launches Pro Charging as a seamless electric fleet management tool for depots, homes, and public charging," published Dec. 16, 2021, retrieved from the internet at <https://electrek.co/2021/12/16/ford-launches-pro-charging-as-a-seamless-electric-fleet-management-tool-for-depots-homes-and-public-charging/>.

(Continued)

*Primary Examiner* — Khoi H Tran
*Assistant Examiner* — Tristan J Greiner
(74) *Attorney, Agent, or Firm* — MARSHALL, GERSTEIN & BORUN LLP

(57) ABSTRACT

A computer-implemented method of predicting and providing an efficient driving route for an electric vehicle (EV) based upon battery health impact includes (i) receiving geographical telematics data; (ii) generating one or more driving routes for the electric vehicle based upon at least the (Continued)

geographical telematics data; (iii) predicting a projected battery health impact on a battery of the electric vehicle for each driving route of the one or more driving routes, wherein the projected battery health impact for each driving route is based at least upon geographical characteristics of the driving route; (iv) determining one or more battery-efficient driving route recommendations based upon at least the projected battery health impact for each driving route; and/or (v) providing the one or more battery-efficient driving route recommendations to a user.

18 Claims, 7 Drawing Sheets

(51) Int. Cl.
  *B60L 53/53* (2019.01)
  *B60L 58/16* (2019.01)
  *B60W 60/00* (2020.01)
  *G01C 21/34* (2006.01)

(52) U.S. Cl.
  CPC ...... *B60W 60/001* (2020.02); *B60W 60/0023* (2020.02); *G01C 21/3461* (2013.01); *G01C 21/3469* (2013.01); *B60W 2510/08* (2013.01); *B60W 2510/18* (2013.01)

(56) References Cited

U.S. PATENT DOCUMENTS

| | | |
|---|---|---|
| 9,290,103 B2 | 3/2016 | Bianco |
| 9,311,271 B2 | 4/2016 | Wright |
| 9,469,289 B2 | 10/2016 | Yu |
| 9,633,487 B2 | 4/2017 | Wright |
| 9,702,718 B2 | 7/2017 | Payne et al. |
| 9,830,748 B2 | 11/2017 | Rosenbaum |
| 9,990,782 B2 | 6/2018 | Rosenbaum |
| 10,192,369 B2 | 1/2019 | Wright |
| 10,198,879 B2 | 2/2019 | Wright |
| 10,269,190 B2 | 4/2019 | Rosenbaum |
| 10,467,824 B2 | 11/2019 | Rosenbaum |
| 11,152,791 B2 | 10/2021 | Qin et al. |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2011/0238457 A1* | 9/2011 | Mason ........... G06Q 10/063112 705/7.14 |
| 2011/0288712 A1 | 11/2011 | Wang et al. |
| 2011/0288765 A1* | 11/2011 | Conway ........... G08G 1/096816 701/533 |
| 2011/0301799 A1 | 12/2011 | Saito |
| 2012/0053771 A1 | 3/2012 | Yoshida |
| 2013/0079962 A1 | 3/2013 | Ishikawa et al. |
| 2015/0112526 A1 | 4/2015 | Martin et al. |
| 2016/0075246 A1 | 3/2016 | Liptak |
| 2016/0221567 A1 | 8/2016 | Ogawa |
| 2016/0272078 A1* | 9/2016 | Kalyanaraman ... G01C 21/3469 |
| 2017/0334454 A1* | 11/2017 | Abe ................. B60W 50/0098 |
| 2017/0361717 A1 | 12/2017 | Qin et al. |
| 2019/0107407 A1* | 4/2019 | Bucsan ............. G01C 21/3461 |
| 2019/0322270 A1 | 10/2019 | Kurihashi et al. |
| 2020/0019161 A1* | 1/2020 | Stenneth .......... G08G 1/096725 |
| 2020/0391612 A1 | 12/2020 | Lee |
| 2020/0393260 A1 | 12/2020 | Falck |
| 2021/0024052 A1 | 1/2021 | Shimada et al. |
| 2021/0063181 A1* | 3/2021 | Saleh ................ G01C 21/3492 |
| 2021/0131812 A1 | 5/2021 | Gong et al. |
| 2021/0197673 A1 | 7/2021 | Espig et al. |
| 2021/0231450 A1 | 7/2021 | Pedersen |
| 2022/0041186 A1* | 2/2022 | Michel ............... H02J 7/00306 |
| 2022/0092893 A1 | 3/2022 | Rosenbaum |
| 2022/0297663 A1* | 9/2022 | Anklam .............. B60W 40/06 |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

Ford Media Center, "Ford Trials Robot Charging Station Designed to Give Disabled Drivers a Much Needed Helping Hand," published Jul. 20, 2022.

SparkCharge Inc., "SparkCharge Unveils ChargeUp Mobile App and Next-Generation Roadie Mobile EV Charger," published Jun. 3, 2021.

* cited by examiner

SYSTEMS AND METHODS FOR AUTONOMOUS VEHICLE BATTERY DELIVERY AND ELECTRIC VEHICLE ROUTING

CROSS REFERENCE TO RELATED APPLICATIONS

This application claims the benefit of (1) U.S. Provisional Patent Application No. 63/350,979, entitled "Systems and Methods for Autonomous Vehicle Battery Delivery and Electric Vehicle Routing," filed Jun. 10, 2022, and (2) U.S. Provisional Patent Application No. 63/353,081, entitled "Systems and Methods for Autonomous Vehicle Battery Delivery and Electric Vehicle Routing," filed Jun. 17, 2022. Each of U.S. Provisional Patent Application Nos. 63/350,979 and 63/353,081 is hereby expressly incorporated by reference herein in its entirety.

FIELD OF THE DISCLOSURE

The present disclosure is directed to technologies associated with monitoring a battery of a vehicle, such as an electric vehicle (EV). In particular, the present disclosure is directed to systems and methods for monitoring a battery of an EV, and routing an EV to reduce overall impact on the battery, as well as routing other vehicles to provide aid to EV with a malfunctioning battery.

BACKGROUND

Technologies associated with operation of EVs (i.e., vehicles that use electric motors for propulsion) are improving and becoming more ubiquitous. As a result, use of EVs (e.g., on roadways, rails, underwater, air, space) is expected to increase, with EVs expected to at least partially replace conventional (i.e., internal combustion engine) vehicles. A typical EV is powered autonomously by a battery (e.g., lithium-ion battery), also known as an electric vehicle battery, which is used to power the propulsion system of the EV. The battery may be recharged and may be mechanically replaced.

It is known that driving behavior, as well as other factors such as weather, traffic, and routes taken, may have a major impact on the fuel consumption of conventional vehicles. However, little work has been done with respect to monitoring a battery of an EV based upon these factors and properly routing EVs to reduce impact on the battery by eliminating or reducing such factors from a route.

Similarly, while the use of EVs and EV batteries is expanding, the availability of charging stations has not become as ubiquitous as the presence of gas stations. As such, although the use of EVs and EV batteries has become more prevalent, in situations where a battery dies, runs out of charge, or otherwise malfunctions, little work has been done with respect to providing aid to such an EV. Conventional techniques may also be inefficient, inconvenient, ineffective, and/or cumbersome, and may have other drawbacks as well.

BRIEF SUMMARY

According to the present embodiments, techniques are provided that may monitor the battery of the EV based upon collected data and take action to provide aid to an EV in need of assistance and/or route an EV to reduce the impact on the battery. More specifically, methods and systems for (i) routing an EV to reduce impact on the health of an EV battery, and (ii) routing vehicles to provide assistance to an EV that has undergone a battery failure event are described.

The methods and system may involve utilizing a pre-existing telematics application (e.g., Drive Safe & Save™ from State Farm®) running on a mobile electronic device disposed in the EV (or running on a processor or control console of the EV), or a new, native application on the mobile electronic device (or mobile device), to capture and send telematics data associated with operation of the EV and the EV battery to a server. The telematics data may pertain to driving events (e.g., acceleration, braking, cornering, direction, and speed) and their frequency and/or duration. The telematics data may also pertain to route length and road infrastructure features, weather conditions (e.g., snow, rain, fog, etc.), traffic characteristics (e.g., traffic density, traffic direction, traffic flow, primary EV types in traffic, etc.), and so on. In some embodiments, the server may analyze the received telematics data to monitor the battery status of the EV, detect failure events in the battery for the EV, and/or predict the potential impact of different routes on the battery.

Accordingly, the present embodiments may, inter alia, enable a fleet management entity, insurance provider, or other suitable individual or entity operating the server to monitor the battery status of one or more EVs and route the EVs or other vehicles accordingly. Therefore, for example, a fleet management entity may monitor the battery status for each EV in its fleet inventory, and generate routes to reduce the impact on the health of the battery. As another example, the fleet management entity may determine, by monitoring the battery status for each EV in the fleet, that a battery for an EV is undergoing (or has undergone) a failure event, and/or routes an autonomous vehicle to provide assistance to the EV.

In one aspect, a computer-implemented method of predicting and providing an efficient driving route for an electric vehicle based upon battery health impact may be provided. The method may be implemented via one or more local or remote processors, transceivers, servers, sensors, memory units, mobile devices, and/or other electric or electronic components. In one instance, the method may include, via one or more processors and/or associated transceivers, (i) receiving, by the one or more processors, geographical telematics data; (ii) generating, by the one or more processors, one or more driving routes for the electric vehicle based upon at least the geographical telematics data; (iii) predicting, by the one or more processors, a projected battery health impact on a battery of the electric vehicle for each driving route of the one or more driving routes, wherein the projected battery health impact for each driving route is based at least upon geographical characteristics of the driving route; (iv) determining, by the one or more processors, one or more battery-efficient driving route recommendations based upon at least the projected battery health impact for each driving route; and/or (v) providing, by the one or more processors, the one or more battery-efficient driving route recommendations to a user. The method may include additional, less, or alternate actions, including those discussed elsewhere herein.

In another aspect, a computing system for predicting and providing an efficient driving route for an electric vehicle based upon battery health impact may be provided. The computing system may include one or more local or remote processors, servers, transceivers, sensors, memory units, mobile devices, and/or other electric or electronic components. In one instance, the computing system may include a memory storing a set of computer-executable instructions;

and one or more processors interfacing with the memory, and be configured to execute the computer-executable instructions to cause the processor to: (i) receive geographical telematics data; (ii) generate one or more driving routes for the electric vehicle based upon at least the geographical telematics data; (iii) predict a projected battery health impact on a battery of the electric vehicle for each driving route of the one or more driving routes, wherein the projected battery health impact for each driving route is based at least upon geographical characteristics of the driving route; (iv) determine one or more battery-efficient driving route recommendations based upon at least the projected battery health impact for each driving route; and/or (v) provide the one or more battery-efficient driving route recommendations to a user. The computing system may include or be configured with additional, less, or alternate functionality, including that discussed elsewhere herein.

In another aspect, a non-transitory computer-readable storage medium storing computer-readable instructions for predicting and providing an efficient driving route for an electric vehicle based upon battery health impact may be provided. The computer-readable instructions, when executed by one or more processors, may cause the one or more processors to (i) receive geographical telematics data; (ii) generate one or more driving routes for the electric vehicle based upon at least the geographical telematics data; (iii) predict a projected battery health impact on a battery of the electric vehicle for each driving route of the one or more driving routes, wherein the projected battery health impact for each driving route is based at least upon geographical characteristics of the driving route; (iv) determine one or more battery-efficient driving route recommendations based upon at least the projected battery health impact for each driving route; and/or (v) provide the one or more battery-efficient driving route recommendations to a user. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
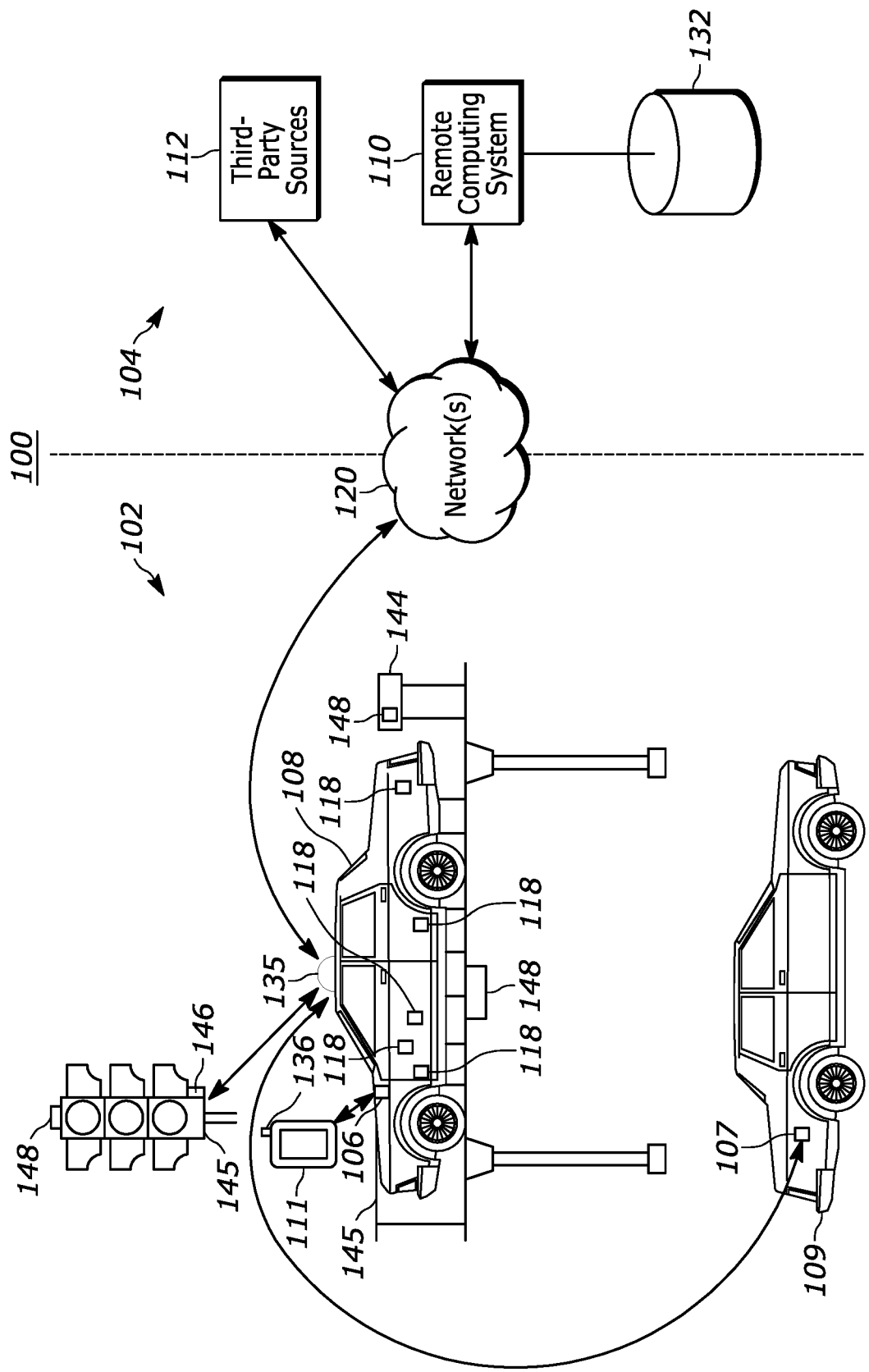
FIG. 1 depicts an overview of exemplary components and entities associated with the systems and methods, according to one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for addressing a failure event associated with a battery for an EV in an emergency event and/or providing an efficient driving route for an EV based upon battery health impact. An emergency event may refer to an event in which a component of an EV, such as the battery, is malfunctioning such that the driver of the EV may not safely continue driving along a road. Similarly, a failure event may refer to an event in which a battery no longer supplies power to a vehicle such as an EV at a previously normal rate. Depending on the implementation, a failure event may be an emergency event and may be determined based upon telematics data from a vehicle, such as sensor data, software output from a battery monitoring program, a notification from a driver, etc.

A battery health impact refers to the impact of driver actions on the current health of the battery. Depending on the implementation, the battery health impact may be determined based upon telematics data from a vehicle, such as sensor data, software output from a battery monitoring program, a notification from a driver, etc. The battery health impact may be based upon historical data and/or may be a prediction by a computing system, such as via an algorithm trained using machine learning and historical data.

The telematics data may initially be generated by the sub-systems and/or sensors of an EV, and may be collected using a mobile electronic device (e.g., smartphone or mobile device) of an occupant (e.g., driver) of the EV and/or a vehicle telematics system onboard the EV, for example. The battery status may then be determined by processing the telematics data and used to determine a failure event has occurred and/or generate a route for a vehicle.

In some embodiments, the system may generate routes for a vehicle undergoing a failure event and/or a vehicle to provide assistance to the vehicle undergoing the failure event. The system may guide the vehicle undergoing the failure event to a safe location (such as a parking lot and/or a roadside location) and subsequently guide the assisting vehicle to the safe location. In further embodiments, the system may guide the assisting vehicle to an intermediate location to pick-up supplies and/or, in the case of autonomous vehicles, personnel to assist the vehicle. Depending on the implementation, the system may further select a vehicle in the final leg, or "last-mile" of a trip to either finish the trip and then render assistance or render assistance on the way to a destination.

In further embodiments, the system may predict a potential battery health impact of different routes when generating routes for an EV according to a variety of factors, such as downhill routes, routes that avoid uphill travel, routes that involve more braking to provide a charge to the battery, routes that have more charging stations, routes that have self-charging road features, etc. Subsequently, the system may determine which route to recommend to a driver or cause an EV to follow based upon the potential battery health impact of potential routes and provide the recommended route(s) to the driver.

As an insurance provider (or other entity) may monitor the battery status and/or compliance with generated route recommendations for a covered EV and make certain decisions related to insurance coverage or assistance depending on the battery age, battery performance, battery manufacturer, rate of adherence to recommended routes, reported use of battery health features along a route, etc. (e.g., determine an insurance premium or discount associated with the EV, generate battery-specific insurance policies or endorsements, provide a lower rate or discount for roadside assistance for customers having a newer battery).

I. Exemplary Environment for Operation of an Autonomous or Semi-Autonomous Vehicle FIG. 1 illustrates an overview of an exemplary system 100 of components configured to facilitate the disclosed systems and methods. Generally, the system 100 may include both hardware components and software applications that may execute on the hardware components, as well as various data communications channels for communicating data between and among the various components. It should be appreciated that the system 100 is merely an example and that alternative or additional components are envisioned.

As illustrated in FIG. 1, the system 100 may be segmented into a set of front-end components 102 and a set of back-end components 104. The front-end components 102 may include a vehicle 108 which may be, for example, an automobile, car, truck, tow truck, snowplow, boat, motorcycle, motorbike, scooter, recreational vehicle, or any other type of vehicle capable of roadway or water travel.

According to certain embodiments, the vehicle 108 may be an autonomous vehicle capable of at least partial (or total) autonomous operation by a computer 106 via the collection and analysis of various sensor data. The vehicle 108 may be an electric vehicle (EV) with an EV battery as described with regard to FIG. 2 below. Further, the vehicle 108 may be an emergency vehicle (e.g., a fire engine or an ambulance), or may be a non-emergency vehicle (e.g., a passenger car). The system 100 may further include at least one additional vehicle 109 capable of at least partial (or total) autonomous operation by a computer 107 via the collection and analysis of various sensor data, where the additional vehicle(s) 109 may be an emergency vehicle(s) or a non-emergency vehicle(s). Although FIG. 1 depicts the two vehicles 108, 109, it should be appreciated that additional vehicles are envisioned.

The computer 106 may be permanently or removably installed in the vehicle 108, and may generally be an on-board computing device capable of performing various functionalities relating to autonomous vehicle automatic operation. Therefore, the computer 106 may be particularly configured with particular elements to thereby be able to perform functions relating to autonomous vehicle automatic operations. Further, the computer 106 may be installed by the manufacturer of the vehicle 108, or as an aftermarket modification or addition to the vehicle 108. In FIG. 1, although only one computer 106 is depicted, it should be understood that in some embodiments, a plurality of computers 106 (which may be installed at one or more locations within the vehicle 108) may be used.

The system 100 may further include an user device 111 that may be associated with the vehicle 108, where the user device 111 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. The user device 111 may be equipped or configured with a set of sensors, such as a location module (e.g., a GPS chip), an image sensor, an accelerometer, a clock, a gyroscope, a compass, a yaw rate sensor, a tilt sensor, and/or other sensors.

The user device 111 may belong to or be otherwise associated with an individual, where the individual may be an owner of the vehicle 108 or otherwise associated with the vehicle 108. For example, the individual may rent the vehicle 108 for a variable or allotted time period, or the individual may at least partially operate (or be a passenger of) the vehicle 108 as part of a ride share. Generally, the individual may at least partially operate the vehicle 108 (and may therefore be an operator of the vehicle), or may be a passenger of the vehicle 108 (e.g., if the vehicle 108 is operating autonomously). According to certain embodiments, the individual may carry or otherwise have possession of the user device 111 during operation of the vehicle 108, regardless of whether the individual is the operator or passenger of the vehicle 108.

In some embodiments, the computer 106 may operate in conjunction with the user device 111 to perform any or all of the functions described herein as being performed by the vehicle 108. In other embodiments, the computer 106 may perform all of the on-board vehicle functions described herein, in which case the user device 111 may not be present or may not be connected to the computer 106. In still other embodiments, the user device 111 may perform all of the onboard autonomous vehicle functions described herein. Still further, in some embodiments, the computer 106 and/or the user device 111 may perform any or all of the functions described herein in conjunction with one or more of the back-end components 104. For example, in some embodiments or under certain conditions, the user device 111 and/or the computer 106 may function as thin-client devices that outsource some or most of the processing to one or more of the back-end components 104.

The computer 106 and/or the user device 111 may communicatively interface with one or more on-board sensors 118 that are disposed on or within the vehicle 108 and that may be utilized to monitor the vehicle 108 and the environment in which the vehicle 108 is operating. In particular, the one or more on-board sensors 118 may sense conditions associated with the vehicle 108 and/or associated with the environment in which the vehicle 108 is operating, and may generate sensor data indicative of the sensed conditions. For example, the sensor data may include a location and/or operation data indicative of operation of the vehicle 108. In some configurations, at least some of the on-board sensors 118 may be fixedly disposed at various locations on the vehicle 108. Additionally or alternatively, at least some of the on-board sensors 118 may be incorporated within or connected to the computer 106. Still additionally or alternatively, in some configurations, at least some of the on-board sensors 118 may be included on or within the user device 111.

The on-board sensors 118 may communicate respective sensor data to the computer 106 and/or to the user device 111, and the sensor data may be processed using the computer 106 and/or the user device 111 to determine when the vehicle 108 is in operation, as well as determine information regarding operation of the vehicle 108. In some situations, the on-board sensors 118 may communicate respective sensor data indicative of the environment in which the vehicle 108 is operating.

According to embodiments, the sensors 118 may include one or more of a GPS unit, a radar unit, a LIDAR unit, an ultrasonic sensor, an infrared sensor, some other type of electromagnetic energy sensor, a microphone (e.g., to support detect/listen for audio/sound wave of siren(s) associated with an emergency vehicle), a radio (e.g., to support wireless emergency alerts or an emergency alert system), an inductance sensor, a camera, an accelerometer, an odometer, a system clock, a gyroscope, a compass, a geo-location or geo-positioning unit, a location tracking sensor, a proximity sensor, a tachometer, a speedometer, and/or the like. Some of the on-board sensors 118 (e.g., GPS, accelerometer, or tachometer units) may provide sensor data indicative of, for example, the vehicle's 108 location, speed, position acceleration, direction, responsiveness to controls, movement, etc.

Other sensors 118 may be directed to the battery in an interior or passenger compartment of the vehicle 108. For example, the on-board sensors 118 directed to the interior of the vehicle 108 may collect information related to the current and past functionality of the battery of an EV, as well as the surroundings of the battery, such as ambient temperature, contact with other components, disconnect of wires to the battery, etc. As such, the on-board sensors 118 may detect and transmit indications of battery failure to a remote computing system 110. In another example, the on-board sensors 118 and/or vehicle computer 106 may detect that the vehicle is being driven at excessive speed, which may cause the computer 106 to log that the vehicle is draining charge from the battery at a rapid rate. In some embodiments, the vehicle 108 may initiate communications to the additional vehicle 109 or to the remote computing system 110 to request assistance or provide information. In further embodiments, the computer 106 may route or provide information for routing the vehicle 108 to an assistance location. In such embodiments, the vehicle 108 would broadcast its location, e.g., via GPS as described herein.

Some of the sensors 118 disposed at the vehicle 108 (e.g., radar, LIDAR, camera, or other types of units that operate by using electromagnetic energy) may actively or passively scan the environment external to the vehicle 108 for obstacles (e.g., emergency vehicles, other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the environment of the vehicle 108. Information or data that is generated or received by the on-board sensors 118 may be communicated to the computer 106 and/or to the user device 111.

In some embodiments of the system 100, the front-end components 102 may communicate collected sensor data to the back-end components 104 (e.g., via a network(s) 120) as telematics data. In particular, at least one of the computer 106 and the user device 111 may communicate with the back-end components 104 via the network(s) 120 to enable the back-end components 104 to record collected sensor data and information regarding autonomous vehicle usage as telematics data. Further, the sensors 118 of the vehicle 108 may transmit geographical telematics data of the surrounding environment to the back-end components 104.

Depending on the implementation, the on-board sensors 118 may further collect and transmit telematics data related to velocity information, acceleration information, braking information, speed information, heading or direction information, steering information, location/position information (e.g., from a GPS system), translational and/or rotational G-force information, on-board diagnostic information, information collected by a camera, video camera, microphone, LiDAR, radar or other device sensing an environment external to an EV (e.g., proximity to other EVs and/or other objects, orientation with respect to other EVs and/or other objects, whether it is sunny, cloudy or dark, external temperature, etc.), automated safety and/or control system information (e.g., adaptive cruise control status and/or when cruise control is engaged/disengaged, forward and/or rear collision warning system outputs, lane departure system outputs, electronic stability control system status, etc.), whether seatbelts are in use, etc.

The network(s) 120 may include a proprietary network, a secure public internet, a virtual private network, and/or some other type of network, such as dedicated access lines, plain ordinary telephone lines, satellite links, cellular data networks, combinations of these and/or other types of networks. The network(s) 120 may utilize one or more radio frequency communication links to communicatively connect to the vehicle 108, e.g., utilize wireless communication link(s) to communicatively connect with the user device 111 and the computer 106. Where the network(s) 120 comprises the Internet or other data packet network, data communications may take place over the network(s) 120 via an Internet or other suitable data packet communication protocol. In some arrangements, the network(s) 120 additionally or alternatively includes one or more wired communication links or networks.

The back-end components 104 include one or more servers or computing devices, which may be implemented as a server bank or cloud computing system 110, and is interchangeably referred to herein as a "remote computing system 110." The remote computing system 110 may include one or more computer processors adapted and configured to execute various software applications and components of the system 100, in addition to other software applications.

The remote computing system 110 may further include or be communicatively connected to one or more data storage devices or entities 132, which may be adapted to store data related to the operation of the vehicle 108, the environment and context in which the vehicle 108 is operating, and/or other information. For example, the one or more data storage devices 132 may be implemented as a data bank or a cloud data storage system, at least a portion of which may be locally accessed by the remote computing system 110 using a local access mechanism such as a function call or database access mechanism, and/or at least a portion of which may be remotely accessed by the remote computing system 110 using a remote access mechanism such as a communication protocol. The remote computing system 110 may access data stored in the one or more data storage devices 132 when executing various functions and tasks associated with the present disclosure.

The back-end components 104 may further include a set of third-party sources 112, which may be any system, entity, repository, or the like, capable of obtaining and storing telematics data that may be indicative of situations and circumstances associated with vehicle operation. Although FIG. 1 depicts the set of third-party source(s) 112 as separate from the one or more data storage devices 132, it should be appreciated that the set of third-party sources 112 may be included as part of the one or more data storage devices 132. In some embodiments, the third-party source(s) 112 may store telematics data indicative of geographical factors. For example, the third-party source 112 may store direction of travel information, lane information, map information, route information, topography information, EV charging measure information, and/or similar information. The third-party source(s) 112 may also maintain or obtain real-time data indicative of traffic signals for roadways (e.g., which traffic signals currently have red lights or green lights). It should be appreciated that the one or more data storage devices or entities 132 may additionally or alternatively store the telematics data as described herein.

To communicate with the remote computing system 110 and other portions of the back-end components 104, the front-end components 102 may include a communication component(s) 135, 136 that are configured to transmit information to and receive information from the back-end components 104 and, in some embodiments, transmit information to and receive information from other external sources, such as autonomous vehicles, other vehicles 109, and/or infrastructure or environmental components disposed within the environment of the vehicle 108. The communication components 135, 136 may include one or more wireless transmitters or transceivers operating at any desired or suitable frequency or frequencies.

Different wireless transmitters or transceivers may operate at different frequencies and/or by using different protocols, if desired. In an example, the user device 111 may include a respective communication component 136 for sending or receiving information to and from the remote computing system 110 via the network(s) 120, such as over one or more radio frequency links or wireless communication channels which support a first communication protocol (e.g., GSM, CDMA, LTE, one or more IEEE 802.11 Standards such as Wi-Fi, WiMAX, BLUETOOTH, etc.). Additionally or alternatively, the computer 106 may operate in conjunction with an on-board transceiver or transmitter 135 that is disposed at the vehicle 108 (which may, for example, be fixedly attached to the vehicle 108) for sending or receiving information to and from the remote computing system 110 via the network(s) 120, such as over one or more radio frequency links or wireless communication channels which support the first communication protocol and/or a second communication protocol.

In some embodiments, the computer 106 may operate in conjunction with the user device 111 to utilize the communication component 136 of the user device 111 to deliver information to the back-end components 104. In some embodiments, the computer 106 may operate in conjunction with the user device 111 to utilize the communication component 135 of the vehicle 108 to deliver information to the back-end components 104. In some embodiments, the communication components 135, 136 and their respective links may be utilized by the computer 106 and/or the user device 111 to communicate with the back-end components 104.

Accordingly, either one or both of the user device 111 or the computer 106 may communicate with the network(s) 120 over the link(s). Additionally, in some configurations, the user device 111 and the computer 106 may communicate with one another directly over a wireless or wired link.

In some embodiments of the system 100, the computer 106 and/or the user device 111 of the vehicle 108 may communicate with respective on-board computers and/or electronic devices disposed at the additional vehicle(s) 109 (e.g., emergency vehicles, other EVs, other autonomous vehicles, or other vehicles), either directly or via the network(s) 120. For example, the computer 106 and/or the user device 111 disposed at the vehicle 108 may communicate with respective on-board computers and/or mobile devices of the additional vehicle(s) 109 via the network(s) 120 and the communication component(s) 135, 136 by using one or more suitable wireless communication protocols (e.g., GSM, CDMA, LTE, one or more IEEE 802.11 Standards such as Wi-Fi, WiMAX, BLUETOOTH, etc.). In some configurations, the computer 106 may directly communicate with the additional vehicle(s) 109 in a peer-to-peer (P2P) manner, which may utilize, for example, a Wi-Fi direct protocol, a BLUETOOTH or other short range communication protocol, an ad-hoc cellular communication protocol, or any other suitable wireless communication protocol.

In some embodiments, the system 100 may include one or more environmental communication components or devices, examples of which are depicted in FIG. 1 by references 144 and 146, that may be used for monitoring the status of one or more infrastructure components 145 and/or for receiving data generated by other sensors 148 that may be associated with, or may detect or be detected by, the vehicle 108 and disposed at locations that are off-board the vehicle 108. As generally referred to herein, with respect to the vehicle 108, "off-board sensors" or "environmental sensors" 148 are sensors that are not transported by the vehicle 108. The data collected by the off-board sensors 148 is generally referred to herein as "sensor data," "off-board sensor data," or "environmental sensor data" with respect to the vehicle 108.

At least some of the off-board sensors 148 may be disposed on or at the one or more infrastructure components 145 or other types of components that are fixedly disposed within the environment in which the vehicle 108 is traveling. Infrastructure components 145 may include roadways, bridges, traffic signals, gates, switches, crossings, parking lots or garages, tollbooths, docks, hangars, or other similar physical portions of a transportation system's infrastructure, for example. Other types of infrastructure components 145 at which off-board sensors 148 may be disposed may include a traffic light, a street sign, a railroad crossing signal, a construction notification sign, a roadside display configured to display messages, a billboard display, a parking garage monitoring device, etc. Off-board sensors 148 that are disposed on or near infrastructure components 145 may generate data relating to the presence and location of obstacles or of the infrastructure component 145 itself, weather conditions, traffic conditions, operating status of the infrastructure component 145, and/or behaviors of various vehicles 108, 109, pedestrians, and/or other moving objects within the vicinity of the infrastructure component 145, for example.

Additionally or alternatively, at least some of the off-board sensors 148 that are communicatively connected to the one or more infrastructure devices 145 may be disposed on or at one or more other vehicle(s) 109 operating in the vicinity of the vehicle 108. As such, a particular sensor that is disposed on-board the additional vehicle 109 may be viewed as an off-board sensor 148 with respect to the vehicle 108.

The one or more environmental communication devices 144, 146 may be communicatively connected (either directly or indirectly) to the one or more off-board sensors 148, and thereby may receive information relating to the condition and/or location of the infrastructure components 145, of the environment surrounding the infrastructure components 145, and/or of the other vehicle(s) 109 or objects within the environment of the vehicle 108. In some embodiments, the one or more environmental communication devices 144, 146 may receive information from the vehicle 108, while, in other embodiments, the environmental communication device(s) 144, 146 may transmit information to the vehicle 108.

As previously discussed, at least some of the environmental communication devices 144, 146 may be locally disposed in the environment in which the vehicle 108 is operating. In some embodiments, at least some of the environmental communication devices 144, 146 may be remotely disposed, e.g., at the back-end components 104 of the system 100. In some embodiments, at least a portion of the environmental communication devices 144, 146 may be included in (e.g., integral with) one or more off-board sensors 148. In some configurations, at least some of the environmental communication devices 144, 146 may be included or integrated into the one or more on-board communication components 135, 136, the computer 106, the user device 111, and/or the additional vehicle(s) 109, or components thereof.

In addition to receiving information from the on-board sensors 118 and off-board sensors 148 associated with the vehicle 108, the computer 106 may directly or indirectly control the operation of the vehicle 108 according to various fully- or semi-autonomous operation features. The autonomous operation features may include software applications or modules implemented by the computer 106 to generate and implement control commands to control the steering, braking, or motive power of the vehicle 108. To facilitate such control, the computer 106 may be communicatively connected to control components of the vehicle 108 by various electrical or electromechanical control components (not shown).

When a control command is generated by the computer 106, it may therefore be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator, or brake pedals, or ignition switches.

Further, the computer 106 may control one or more operations of the vehicle 108 when the vehicle is operating non-autonomously. For example, the computer 106 may automatically detect respective triggering conditions and automatically activate corresponding features such as traction control, windshield wipers, headlights, braking, etc.

In certain embodiments, the remote computing system 110 may alternatively or additionally control the operation of the vehicle 108 according to various fully-autonomous or semi-autonomous operation features. In particular, the remote computing system 110 may include software applications or modules to generate and implement control commands to control the steering, braking, or motive power of the vehicle 108. In operation, the remote computing system 110 may generate control command(s) and communicate the control command(s) to the computer 106 via the network(s) 120 and the communication component 135, which may communicate the command(s) to the control components of the vehicle 108 to effect a control action.

Figure 2:
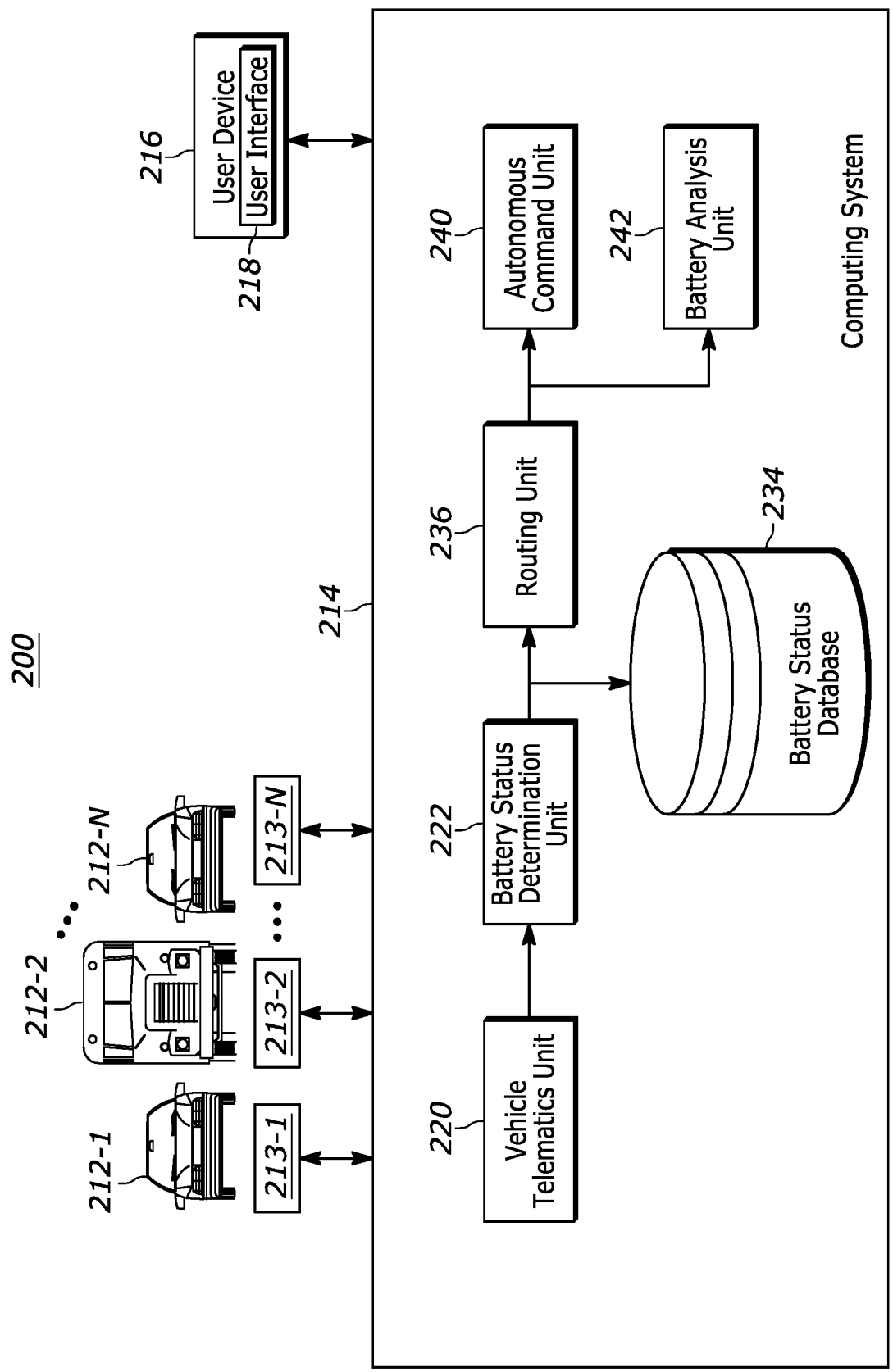
FIG. 2 depicts an exemplary computing environment including components associated with monitoring batteries of electric vehicles (EVs), according to one embodiment.

II. Exemplary Environment for Assessing and/or Predicting Battery Status Based Upon Telematics Data FIG. 2 depicts an exemplary environment 200 in which telematics data may be used to assess and/or predict battery status, according to one embodiment. As illustrated in FIG. 2, the environment 200 may include vehicles 212-1 through 212-N, a computing system 214, and a user device 216. The vehicles 212-1 through 212-N may include EVs such as cars, vans, trucks, motorcycles, and/or any other EV type(s) as well as autonomous and/or semi-autonomous vehicles. Depending on the implementation, the vehicles 212-1 through 212-N may further include solar electric vehicles (solar EVs), EVs with solar panels, or similar EVs that use batteries or power sources that utilize solar power. In some such implementations, the solar EVs have a solar mode or power option that allows the EV to use solar energy to power the vehicle as well as a traditional power mode or option that relies instead on an EV battery charged using other sources. In some implementations, vehicles 212-1 through 212-N may include vehicle 108 or 109 of FIG. 1 and the various components discussed therein. Similarly, the computing system 214 may be, include, or be part of remote computing system 110 and user device 216 may be, include, or be part of user device 111.

In some embodiments, the vehicles 212-1 through 212-N may be vehicles of a fleet, and the computing system 214 may be associated with a business, agency, or organization for maintaining the fleet. For example, the computing system 214 may include one or more servers of a shipping company, a public utility company, a public transportation company, a car rental company, a police department, a company with a mobile sales force, etc. In such embodiments, the user device 216 may be a computing device of a fleet management entity.

In some embodiments, the vehicles 212-1 through 212-N may be EVs and/or autonomous or semi-autonomous vehicles covered under insurance policies offered by an insurance provider, and the computing system 214 may be associated with (e.g., include one or more servers of) the insurance provider. In such embodiments, the user device 216 may be a computing device of an insurance provider employee.

The user device 216 may be a terminal device, a personal computer, a laptop computer, a tablet, a smartphone, or any other suitable computing device in communication with the computing system 214. The user device 216 may communicate with the computing system 214 via one or more wired and/or wireless networks such as network 102 of FIG. 1. Alternatively, the user device 216 may be a part of the computing system 214. The user device 216 may also include a user interface 218 having software and/or hardware components for displaying information to the user and/or accepting inputs from the user (e.g., a web browser application, a graphics card or chip, a monitor or touchscreen, a mouse, a keyboard, etc.).

Each of the vehicles 212-1 through 212-N may carry a vehicle telematics system capable of collecting telematics data reflecting operation of the respective vehicle. For example, the vehicle telematics system in each of vehicles 212-1 through 212-N may include sensors and/or subsystems configured to collect any one or more types of telematics data as described in FIG. 1 with regard to on-board sensors 118.

In some embodiments, the telematics data may include various types of data indicative of features of historical routes taken by vehicles 212-1 through 212-N, such as camera data, LiDAR data and/or data that the vehicles 212-1 through 212-N received via vehicle-to-infrastructure (V2I) communications, for example. In further embodiments, the telematics data may additionally or alternatively include various types of data indicative of features of historical routes taken by autonomous and/or semi-autonomous vehicles, such as historical logs, instructions, etc.

The features may include static (or semi-static) features, such as route length and road infrastructure features, for example. Road infrastructure features may include any number of different features, such as lane widths for one or more road segments on each route, number of lanes for one or more road segments on each route, type of lane markings for one or more road segments on each route, road surface friction coefficients for one or more road segments on each route, elevation changes for one or more road segments on each route, curve parameters (e.g., frequency of curves, angle, radius, length, apex, bank, etc.) for one or more road segments on each route, intersection parameters (e.g., intervals between intersections, whether a stoplight is present, whether the intersection is a four-way stop, etc.) for one or more road segments on each route, signage parameters (e.g., size of sign, size of letters on sign, etc.) for one or more road segments on each route, bicycle lane parameters (e.g., type, markings, location, etc.) for one or more road segments on each route, and so on.

The features may additionally or alternatively include one or more dynamic features, such as the conditions in which each route was driven. For example, the features may include weather conditions (e.g., snow, rain, fog, etc.) along one or more road segments of each route, the presence or absence of road construction along one or more road segments of each route, traffic characteristics (e.g., traffic density, traffic direction, traffic flow, primary EV types in traffic, use of autonomous characteristics in traffic, etc.) along one or more road segments of each route, and so on.

Each vehicle telematics system may provide only raw telematics data (e.g., sensor outputs), or may process some or all of the raw telematics data to provide higher-level information (e.g., orientations of nearby objects, types of weather and/or road conditions, etc.). In different embodiments, different ones of vehicles 212-1 through 212-N may have vehicle telematics systems that vary in certain respects, or all of the vehicles 212-1 through 212-N may be equipped with the same vehicle telematics systems.

Each of some or all of the vehicle telematics systems in the vehicles 212-1 through 212-N may be configured to enable transfer of the collected information to the computing system 214, where the data may be collected by a vehicle telematics unit 220. For example, each of some or all of the vehicles 212-1 through 212-N may be equipped with a communication system that includes a transmitter and one or more antennas to wirelessly transmit the data, as described with more detail in FIG. 1 above.

In other embodiments, each of some or all of the vehicles 212-1 through 212-N may include an interface to a portable memory device, such as a portable hard drive or flash memory device. In some of these latter embodiments, the portable memory device may be used to download data from a vehicle 212 (i.e., any of the vehicles 212-1 through 212-N) and then may be manually carried to the computing system 214. In still other embodiments, the portable memory device may be used to download data from a vehicle 212 to a driver's computer device (e.g., desktop computer, laptop computer, smartphone, etc.), which may in turn be used to transmit the data to the computing system 214 via wired and/or wireless networks.

The vehicle telematics unit 220 may provide the collected telematics data to a battery status determination unit 222, which may then calculate battery statuses for batteries of EVs in the fleet of vehicles 212-1 through 212-N based upon the collected telematics data. For example, the vehicle telematics unit 220 may store the collected telematics data in one or more persistent memories of the computing system 214, such as data storage device 132 discussed with regard to FIG. 1, and send battery status determination unit 222 an indication when new data is available.

In various different embodiments, battery status determination unit 222 may determine the health of a battery for each EV. In particular, in some embodiments, the battery status determination unit 222 may determine whether a battery failure event has occurred, is occurring, or will occur for the battery of an EV in vehicles 212. For example, the battery status determination unit 222 may determine when a battery is low on charge (e.g., 20% charge, 15% charge, 10% charge, less charge than required to complete a trip, etc.), when a battery is malfunctioning, when a battery causes a short circuit, etc.

In further embodiments, the battery determination unit 222 may determine the current health status of a battery as well as determine the potential impact of driver actions on the battery. For example, battery status determination unit 222 may determine a health impact relating to different types of EV operation (e.g., "smoothness" of acceleration, braking and/or cornering, length of routes to be followed, time spent fully charged, etc.).

Depending on the implementation, the battery determination unit 222 may determine that a battery will undergo a battery failure event during the course of an ongoing trip or during a future trip. For example, the computing system 214 may determine that a trip with a final destination of a restaurant is likely to be followed by another trip and predict a battery status for the second trip as well.

Battery statuses determined by battery status determination unit 222 may be added to a battery status database 234, which may be stored in a persistent memory, or in another memory external to the computing system 214. Battery statuses may also be provided to a routing unit 236 to generate routes for vehicles 212-1 through 212-N based upon the battery statuses. The battery status determination unit 222 may also transmit a notification to the user device 216 upon detecting that a battery failure event occurs. Depending on the embodiment, the battery status determination unit 222 may determine a response to the battery failure event and may include indications to the user device 216 of actions to take based upon the determined response, including a notification to pull the vehicle over and await assistance.

In some embodiments, the routing unit 236 may generate routes for vehicles 212-1 through 212-N. In embodiments in which the routing unit 236 receives an indication of a battery failure event from the battery status determination unit 222, the routing unit 236 may generate a route for a vehicle to an assistance location, such as the side of the road or a nearby parking lot. Similarly, the routing unit 236 may generate a route to the assistance location for an autonomous vehicle. In some implementations, the routing unit 236 may use telematics data from the telematics data unit 220 and/or from a vehicle in the vehicles 212-1 through 212-N to determine the location of autonomous vehicles in the fleet of vehicles 212-1 through 212-N and subsequently generate the route from the autonomous vehicle to the assistance location. In some implementations, the routing unit 236 may determine which autonomous vehicle to provide instructions to, such as the nearest, the cheapest to transport, the most available, the most well-supplied, etc.

The routes generated by routing unit 236 may depend on the setting in which the environment 200 is used. If an EV of the vehicles 212-1 through 212-N is being driven by a user when the battery status determination unit 222 determines that a battery-related problem is occurring, then the routing unit 236 may determine a location for the EV to pull over and cause a user device 216 to provide a notice of the location to a driver via the user interface 218. Similarly, the routing unit 236 may further determine a route to the location for the EV and cause a user device 216 to provide the route to the driver via the user interface 218.

In some embodiments, routes determined and generated by routing unit 236 as well as battery status information determined by the battery status determination unit 222 may be provided to an autonomous command unit 240. The autonomous command unit 240 may generate and/or transmit a command to an autonomous vehicle 212-2 of the vehicles 212-1 through 212-N to cause the autonomous vehicle 212-2 to drive to the assistance location for vehicle 212-1. In some implementations, the autonomous command unit 240 may include instructions based upon the battery status as determined by battery status determination unit 222. For example, the autonomous command unit 240 may, upon receiving an indication that a battery is depleted from the battery status determination unit 222, include a command to transport connecting cables and charge the battery in vehicle 212-1. In further implementations, the routing unit 236 may further calculate and provide a route to the nearest charging station. The autonomous command unit 240 may then calculate a necessary charge required to reach the nearest charging station and include the necessary charge in the instructions.

Depending on the implementation, the autonomous command unit 240 and/or the battery status determination unit 222 may determine a particular response to detecting a battery failure event. For example, the autonomous command unit 240 and/or the battery status determination unit 222 may determine that routing an autonomous vehicle 212-2 to the assistance location will address the situation. In further examples, the autonomous command unit 240 and/or the battery status determination unit 222 may receive an indication that the autonomous vehicle 212-2 does not have sufficient materials or personnel onboard, and may begin routing for a different autonomous vehicle or may generate a route for the autonomous vehicle 212-2 that includes stops to pick up required materials and/or personnel. In still further implementations, the autonomous command unit 240 may receive an indication that the battery of an EV in the vehicles 212-1 through 212-N may not receive assistance at the assistance location and generate a route for an autonomous vehicle to collect the EV and/or move the EV to a repair location.

In further embodiments, routes determined and generated by routing unit 236 may be provided to a battery analysis unit 242. Alternatively or additionally, the battery statuses generated by battery status determination unit 222 may be provided to the battery analysis unit 242 directly (i.e., routing unit 236 may be omitted). Battery analysis unit 242 may analyze the routes and/or battery statuses to determine whether a route will have a battery health impact, such as an effect on the health or charge of a battery. The battery health impact may be based upon the geographical characteristics of a particular driving route, a preferred form of operation, historical battery health data, presence of autonomous or semi-autonomous features, etc.

Depending on the implementation, the geographical characteristics may include features of a route that may increase or decrease the charge consumption or general health of the battery, such as downhill routes, uphill travel and alternatives thereof, predicted additional breaking, additional charging stations along the route, self-charging road features, etc. In some implementations, the battery health impact may be a positive impact (i.e., the battery health and/or charge is improved by taking a particular route).

After determining a battery health impact, the battery analysis unit 242 may determine particular battery-efficient driving route recommendations based upon the battery health impact for each driving route. In some implementations, the battery analysis unit 242 may determine that a driving route is a battery-efficient driving route and/or recommend the battery-efficient driving route if the associated battery health impact satisfies a predetermined threshold. In some implementations, the battery analysis unit 242 may determine that a battery health impact satisfies a predetermined threshold if it is zero or positive and/or if the battery health impact is greater than a predetermined negative number. In further implementations, the battery analysis unit 242 may determine that a driving route is a battery-efficient driving route if it has the lowest battery impact of the generated driving routes. Similarly, a predetermined number of driving routes with the lowest battery impact of the generated driving routes may be determined to be battery-efficient driving routes.

In some implementations, the battery analysis unit 242 may determine the battery-efficient driving route recommendations based upon a preferred form of operation. For example, the battery analysis unit 242 may receive an indication from a driver or an EV in vehicles 212-1 through 212-N that the EV should prioritize the most charge efficient route, the most battery-health efficient route, the most environmentally friendly route, the fastest route, etc. In further implementations, the battery analysis unit 242 may further determine that a vehicle is an autonomous vehicle or a vehicle with autonomous or semi-autonomous features and determine that the preferred form of operation is to prioritize routes with battery health features over faster routes, as the autonomous vehicle may not have a driver. In some implementations, the battery analysis unit 242 may immediately select a route based upon preferred form of operation. In other implementations, the battery analysis unit 242 may weight factors in accordance with the preferred form of operation and select battery-efficient driving route recommendation(s) based upon such.

In some implementations, predicting a battery health impact, determining a battery-efficient route recommendation, identifying a battery failure event, etc. may be performed using an algorithm trained by a machine learning model. In particular, the machine learning model may use historical geographical data and geographic telematics data, particular times of day, particular makes and/or models of cars, etc. to train the algorithm.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

In some embodiments, the methods and systems described herein may use machine learning techniques to identify and estimate the effects of observed or latent variables such as weather, temperature, seasonal hazards and/or changes, local fauna, landscape, local classification (e.g., urban, rural, suburban, city, town, village, etc.), proximity to a highway, proximity to various businesses, proximity to schools, proximity to a hospital, proximity to a fire station, proximity to a police station, etc. on an EV and the likelihood of performing harmful and/or battery-draining tasks.

Some embodiments described herein may include automated machine learning to predict battery health impact, determine a battery-efficient route recommendation, determine that a battery has undergone a failure event, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing telematics data in order to facilitate making predictions for subsequent data. Models may be created based upon example inputs of data in order to make valid and reliable predictions for novel inputs.

Additionally or alternatively, the machine learning programs may be trained by inputting sample data sets or certain data into the programs, such as mobile device, server, or vehicle system sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with vehicle and/or mobile device-mounted sensor data to identify certain battery or EV data, such as analyzing vehicle telematics data and/or user telematics data to identify potentially impactful routes, determine information relevant to battery health, identify battery failure events, and/or other such potentially relevant data.

After training, machine learning programs (or information generated by such machine learning programs) may be used to evaluate additional data. Such data may be related to publicly accessible data, such as building permits and/or chain of title. Other data may be related to privately-held data, such as insurance and/or claims information related to the property and/or items associated with the property. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

In some embodiments, each of some or all of units 220, 222, 236, 240, and 242 may be (or may include) a respective set of one or more processors that executes software instructions to perform the functions described above, or some or all of the units 220, 222, 236, 240, and 242 may share a set of one or more processors. Alternatively, each of some or all of units 220, 222, 236, 240, and 242 may be a component of software that is stored on a computer-readable medium (e.g., a random access memory (RAM) and/or read-only memory (ROM) of the computing system 214) and executed by one or more processors of the computing system 214 to perform the functions described herein. In some embodiments, the computing system 214 may include more, fewer and/or different units than are shown in FIG. 2, including any of the components discussed elsewhere herein. For example, either autonomous command unit 240 or battery analysis unit 242 may be omitted, and/or ranking unit 236 may be omitted.

If used in an insurance setting, battery action unit 242 may use the battery statuses and/or compliance with generated routes to determine risk ratings for the drivers of EVs 212-1 through 212-N, or may battery statuses and/or compliance with generated routes to a different computing system that handles a risk underwriting process, for example. The risk underwriting process may factor in other aspects of batteries that may be stored in database 234, such as the age of the particular battery, typical performance of the particular battery, manufacturer of the particular battery, etc.

Once a risk rating is determined for a driver, the rating may be used by battery action unit 242 (or another unit and/or computing system) to determine a premium and/or discounts for an insurance policy (e.g., a battery-specific insurance policy) for that driver, or a discount for providing assistance for customers having a lower risk rating. For example, the risk rating may be lower for a customer having a newer battery that has a healthy battery status or that consistently follows battery health route recommendations, for example. The risk ratings may also, or instead, be provided to user device 216 for display via user interface 218.

Other settings are also contemplated. For example, an entity (e.g., manufacturer of EV batteries, seller of parts to the manufacturer, vehicle salvage yards, used car dealers, non-profit organization) that manages a battery replacement, repair, and/or recycle program may monitor the battery status for each EV in its program, and make certain decisions (e.g., transfer battery in good condition that is included in a damaged EV to a non-damaged EV, recycle old battery into new battery, sell metals such as lithium and cobalt contained in a battery to a manufacturer of new batteries, designate a battery for use as a power source for communities suffering from a natural disaster, repair a battery by replacing a malfunctioning cell in a battery pack) based upon battery statuses provided by the autonomous command unit 240. For example, the entity monitoring the battery status may prepare a replacement battery, prepare materials to repair the battery, or prepare to receive a defective battery based upon the instructions transmitted by the autonomous command unit 240.

As can be seen from the above discussion, the components in the environment 200, when using the above techniques, may allow a fleet management entity, insurance provider, or other individual or entity associated with the computing system 214 to determine battery statuses based upon received telematics data and improve the routing for electric and/or autonomous vehicles. As such, the environment 200 may allow for better routing of electric vehicles to a safe location in the event of an emergency, as well as may improve the response time for a vehicle dispatched to address a failure for the battery of the electric vehicle.

Further, the environment 200 may allow for determination of closest and/or ideal autonomous vehicle to minimize response time and improve routing to the electric vehicle. Moreover, the environment 200 may improve the route planning and overall battery health of the battery for an electric vehicle through the use of the battery analysis unit. As such, the resource usage or consumption of the components in the environment 200 (e.g., in the computing system 214 and/or the user device 216) that otherwise would be spent on determining separate routes for each vehicle from an initial starting location (such as a home base or garage) may be reduced. Additionally, the overall operation of the battery for electric vehicles may be improved.

Figure 3:
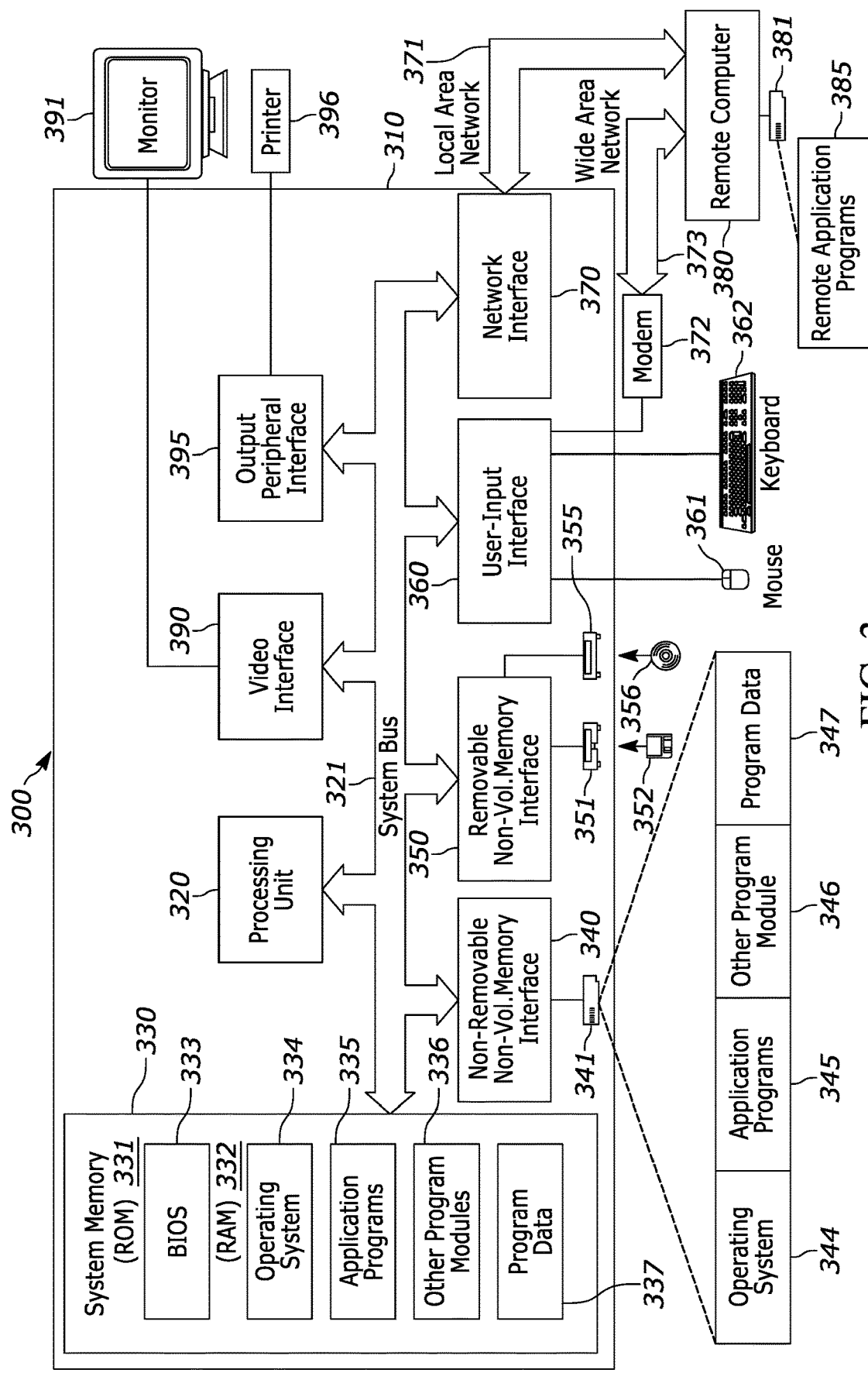
FIG. 3 depicts an exemplary computer system in which the techniques described herein may be implemented, according to one embodiment.

III. Exemplary Computer System for Using Telematics Data to Determine and Monitor Battery Status FIG. 3 depicts an exemplary computer system 300 in which the techniques described herein may be implemented, according to one embodiment. The computer system 300 of FIG. 3 may include a computing device in the form of a computer 310. In some implementations, the computer system 300 may be, be part of, or include system 100 of FIG. 1, such as part of remote computing system 110, or environment 200 of FIG. 2, such as part of computing system 214. Similarly, computer 310 may be or be part of user device 111 in FIG. 1 or user device 216 in FIG. 2.

Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that may be accessed by computer 310 and may include both volatile and nonvolatile media, and both removable and non-removable media. By way of example, and not limitation, computer-readable media may comprise computer storage media and communication media.

Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 3 provide storage of computer-readable instructions, data structures, program modules and other data for the computer 310. In FIG. 3, for example, hard disk drive 341 is illustrated as storing operating system 344, application programs 345, other program modules 346, and program data 347. Note that these components may either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment via a network, such as network 120 of FIG. 1, using logical connections to one or more remote computers, such as a remote computer 380. The remote computer 380 may be a personal computer, a server, a router, a network PC, a peer device or other common network node, and may include many or all of the elements described above relative to the computer 310, although only a memory storage device 381 has been illustrated in FIG. 3. In some implementations, the remote computer 380 may be or be part of remote computing server 110 of FIG. 1 and/or computing system 214 of FIG. 2. The logical connections depicted in FIG. 3 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 3 illustrates remote application programs 385 as residing on memory device 381.

The techniques for using telematics data to assess battery status described above may be implemented in part or in their entirety within a computer system such as the computer system 300 illustrated in FIG. 3. The computer 310 may be a computing device of a fleet management entity or insurance provider employee (e.g., user device 216 of FIG. 2 or user device 111 of FIG. 1), for example, and the remote computer 380 may be a server device (e.g., within computing system 214 of FIG. 2 or remote computing system 110 of FIG. 1) that receives telematics data, e.g., from mobile electronic device 13, and determines a battery status. In some such embodiments, the LAN 371 or the WAN 373 may be omitted, though a network such as network 120 of FIG. 1 may still be utilized. Application programs 335 and 345 may include a software application (e.g., a web-browser application) that is included in user interface 218 of FIG. 2, for example. Computer 310 may receive from computer 380 data indicating battery statuses and/or route information, for example.

Figure 4A:
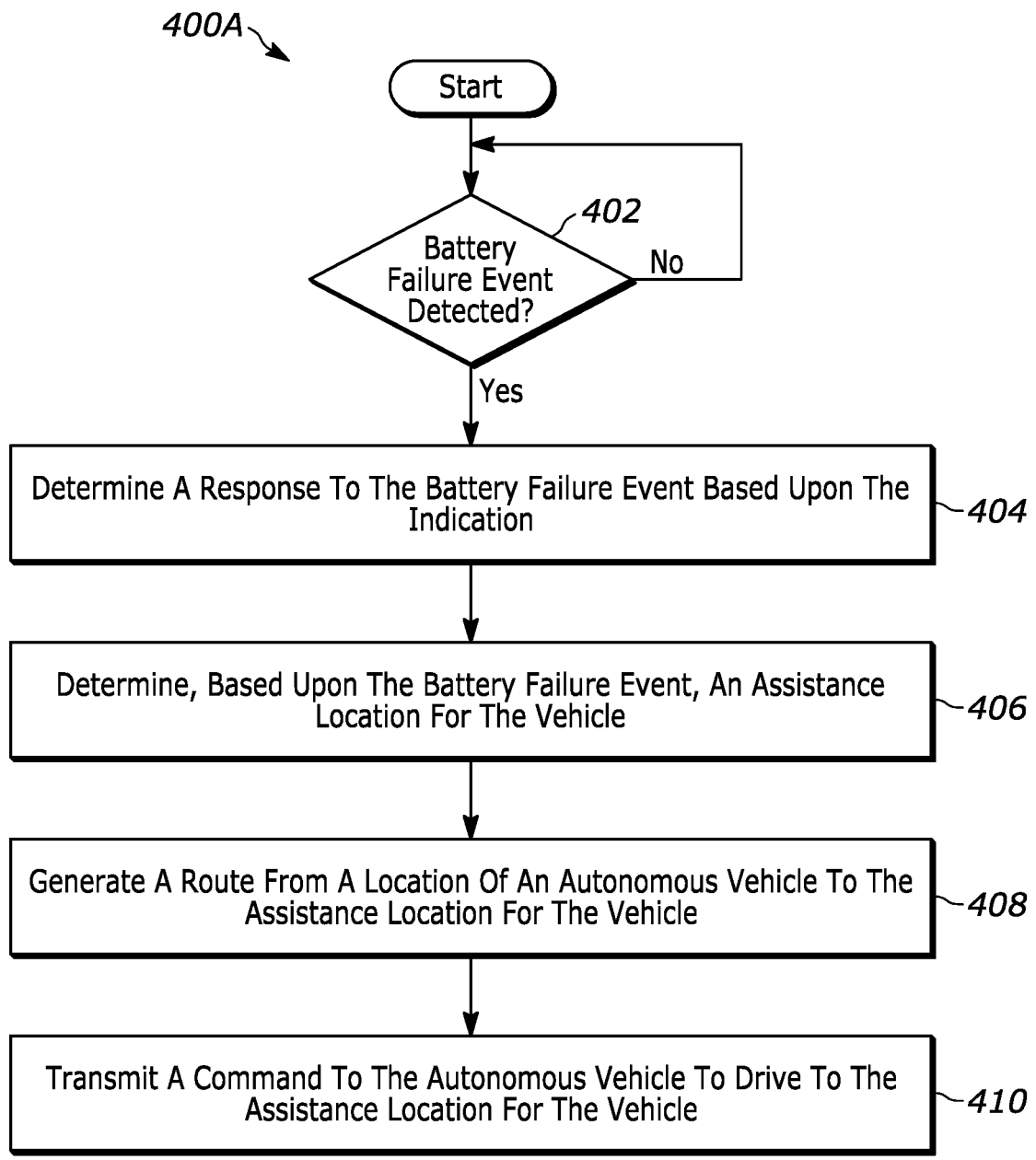
FIG. 4A depicts a flow diagram of an exemplary computer-implemented method for addressing a failure event associated with a battery for an EV in an emergency situation, according to one embodiment.

IV. Exemplary Method for Addressing a Failure Event Associated with a Battery for an Electric Vehicle FIG. 4A depicts a flow diagram of an exemplary computer-implemented method 400A for addressing a failure event associated with a battery for an EV in an emergency situation, according to one embodiment. For clarity, the method 400A is discussed with specific reference to elements as described herein with regard to FIGS. 1 and 2. However, it should be understood that, depending on the implementation, the method 400A may be implemented on other, similar components.

At block 402, the computing system 214 may determine whether an indication of a battery failure event has been detected, such as by a battery status determination unit 222. If a battery failure event has not been detected, the method 400 may loop until a battery failure event is detected, indicating that the EV is in an emergency situation, at which point flow continues to block 404.

Depending on the implementation, the indication of the battery failure event may be a user correspondence from the user device 216 indicating that the battery has failed, automatic correspondence from software associated with the EV, an output from a battery monitoring program associated with the battery, an indication from the battery status database 234, a response to a query from the computing system 214, etc. Further, depending on the implementation, the indication may further be a direct notification to the computing system 214 with minimal details (i.e., a notification that the battery has failed); an indication of battery characteristics that suggest potential failure with the battery, such as an indication of temperature fluctuations, an indication of increased loss of charge, an indication of shorts or flares in the circuitry associated with the battery, etc.; an indication of an approaching milestone or historic expected battery death date; and/or any other similar indication that may lead the computing system 214 to determine that the battery of the EV has failed, is failing, or will fail.

In some implementations, the indication of the battery failure event may be an indication of a past event, in that the battery has already failed. In further implementations, the indication of the battery failure event may be an indication of a concurrent failure event, in that the battery has begun failing, but has not fully failed. In still further implementations, the indication of the battery failure event may be an indication of a future failure event, in that the computing system 214 may determine and/or predict that a battery may fail in the near future.

At block 404, the computing system 214 may determine a response to the battery failure event based upon the indication of the battery failure event. In some implementations, the response to the battery failure event may include an indication for the autonomous vehicle to transport one or more replacement batteries and/or materials to repair the battery (e.g., replacement battery pack cells) to the assistance location. In further implementations, the response to the battery failure event may include an indication for the autonomous vehicle to drive to the assistance location and provide a charge to the battery of the electric vehicle. In some such implementations, the response to the battery failure event may include an indication for the autonomous vehicle to provide the charge to the battery of the electric vehicle by performing a flat tow operation for the EV. As such, the flat tow operation may cause the EV to regenerate a charge by activating a regenerative braking mode and/or level while being towed. Depending on the implementation, the computing system 214 may determine a location to which the autonomous vehicle may tow the EV, such as a nearby charging station, garage, automotive repair location, etc. In further implementations, the computing system 214 may determine that the autonomous vehicle should tow the EV until the EV battery reaches a predetermined charge threshold.

In implementations in which the computing system 214 includes an indication to provide a charge to the battery of the electric vehicle, the computing system 214 may further determine to provide only enough power for the EV to reach a nearby charging station. As such, the computing system 214 may determine the location of the nearest charging station and calculate the required charge and estimated charge time necessary to reach the location of the nearest charging station. In some implementations, the computing system 214 may then cause a user device 216 to provide the estimated charge time needed to reach the location of the nearest charging station.

In implementations in which the indication of the battery failure event is an indication of potential future failure, the response to the battery failure event may include notifying the user via the user device 216 that battery failure is imminent, and provide instructions of actions to mitigate and/or avoid the effects of failure. For example, the computing system 214 may notify the user via the user device 216 that the EV battery will likely fail soon, and advise the driver to find a safe location to pull to the side of the road.

At block 406, the computing system 214 may determine, based upon the battery failure event, an assistance location for the vehicle. In some implementations, the computing system 214 may predict a future location for the EV along the route for the EV, and the assistance location is the predicted future location for the EV.

Depending on the implementation, the computing system 214 may predict the future location based upon the battery failure event. For example, if the battery failure event is the battery running low on power, the computing system 214 may determine how long the battery will last and determine a likely location for the driver to pull over, such as a parking lot, gas station, rest stop, etc. in the time before the battery runs out of power. If the battery failure event is a more immediate event, such as a sudden cessation of power from the battery, the computing system 214 may determine that the predicted future location will be near the location of the event, such as along the side of the road.

At block 408, the computing system 214 may generate a route from a location of an autonomous vehicle to the assistance location for the vehicle. In some implementations, the route from the location of the autonomous vehicle to the assistance location for the vehicle may include additional stops for the autonomous vehicles. For example, the route may include locations where the autonomous vehicle may receive a new battery, charging cables, jumper cables, personnel, towing equipment, repair equipment, or any other similar person or item that may assist in solving a battery failure event. Depending on the implementation, the route may further extend beyond the assistance location. For example, when the computing system 214 determines that the response to the battery failure event is to perform a flat tow operation for the EV, the route may include a destination location to which the autonomous vehicle performs the flat tow operation.

Depending on the implementation, the computing system 214 may determine that multiple autonomous vehicles are within range to expediently reach the assistance location. As such, the computing system 214 may determine the locations of the autonomous vehicles and determine which autonomous vehicle to route to the assistance location. In some such implementations, the computing system 214 may route the autonomous vehicle closest to the assistance location. In further implementations, the computing system 214 may route the autonomous vehicle with an expected travel time to the assistance location closest in value to the travel time to the assistance location for the EV. In other implementations, the computing system 214 may route an autonomous vehicle in a final portion of a trip, such as the last mile of a trip. In still other implementations, the computing system 214 may take other such factors into account in determining which autonomous vehicle to route to the assistance location, such as traffic, gas, power for the autonomous vehicle, etc.

At block 410, the computing system 214 may transmit a command to the autonomous vehicle to drive to the assistance location for the vehicle. In some implementations, the command to the autonomous vehicle to drive to the assistance location may include the determined response to the battery failure event and the route from the location of the autonomous vehicle to the assistance location. In some implementations, the autonomous vehicle may receive the command from the computing system 214 and begin following the route as soon as safely possible. In further implementations, the autonomous vehicle may receive the command from the computing system 214 and complete a trip, delivery, task, etc. before following the route.

Figure 4B:
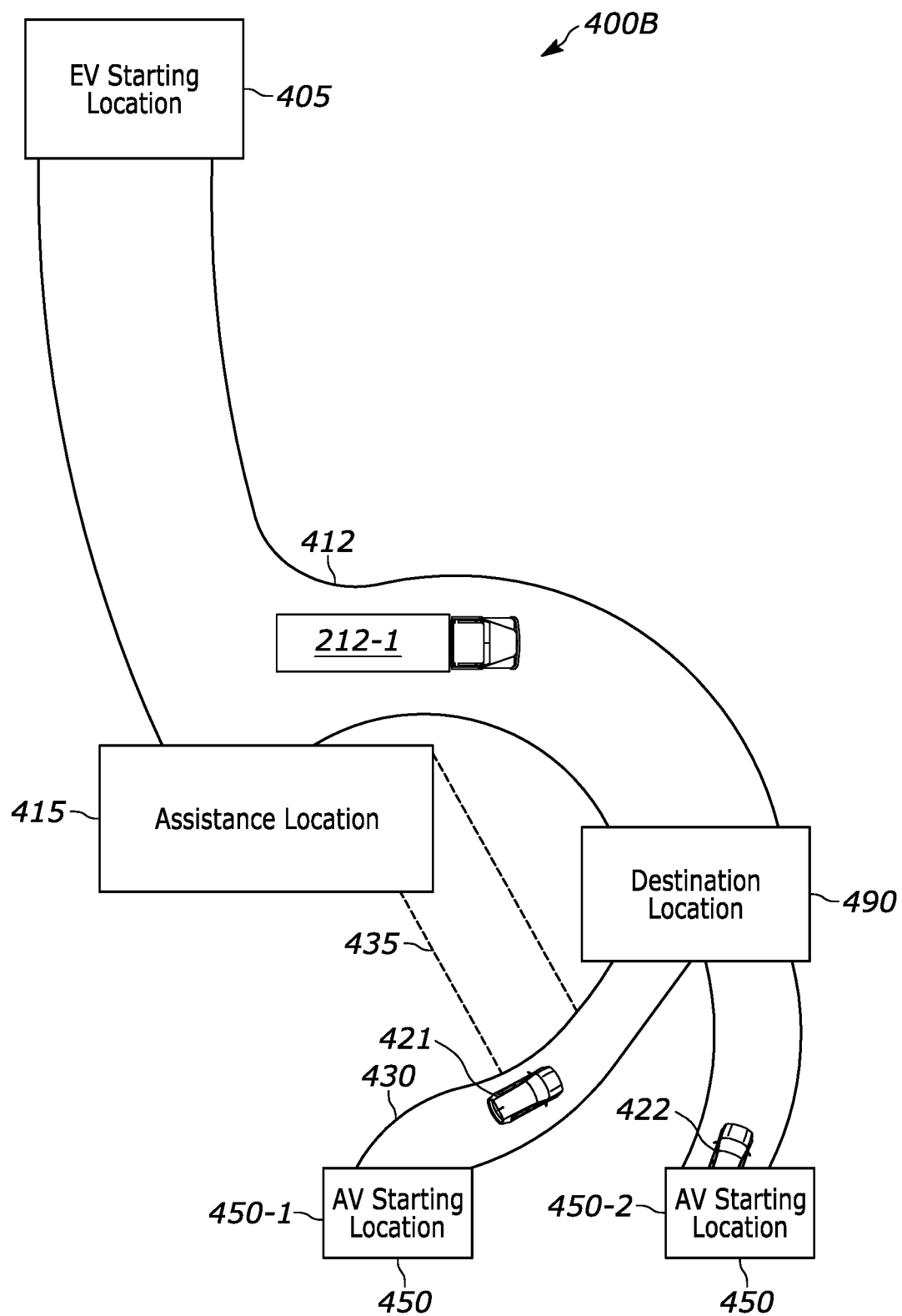
FIG. 4B depicts an example diagram for predicting an assistance location for an EV in an emergency situation and routing an autonomous vehicle to the assistance location, according to one embodiment.

FIG. 4B depicts an example scenario in which an EV 212-1 has a battery failure event during a trip along a route 412 from EV starting location 405 to destination location 490. After the battery failure event, the computing system 214 may determine that the EV 212-1 will pull over along the side of the road at assistance location 415, as described above with regard to FIG. 4A. The computing system 214 may determine that two available autonomous vehicles 421 and 422 are nearby on trips from autonomous vehicle starting locations 450 (450-1 and 450-2 for autonomous vehicles 421 and 422, respectively). The computing system 214 may then determine that autonomous vehicle 421 is closer to assistance location 415 and calculates route 435 to the assistance location 415.

The computing system 214 may then transmit an indication to autonomous vehicle 421 to stop following route 430 and begin following route 435. The autonomous vehicle 421 may determine that the autonomous vehicle 421 does not have the proper supplies to assist or must complete a trip first and indicate such to the computing system 214. The computing device may then determine that the autonomous vehicle 421 should follow route 430 to destination location 490, where the autonomous vehicle may complete the trip or receive supplies such as a replacement battery, replacement cells, cables, etc. and follow route 412 to the assistance location 415.

Figure 5A:
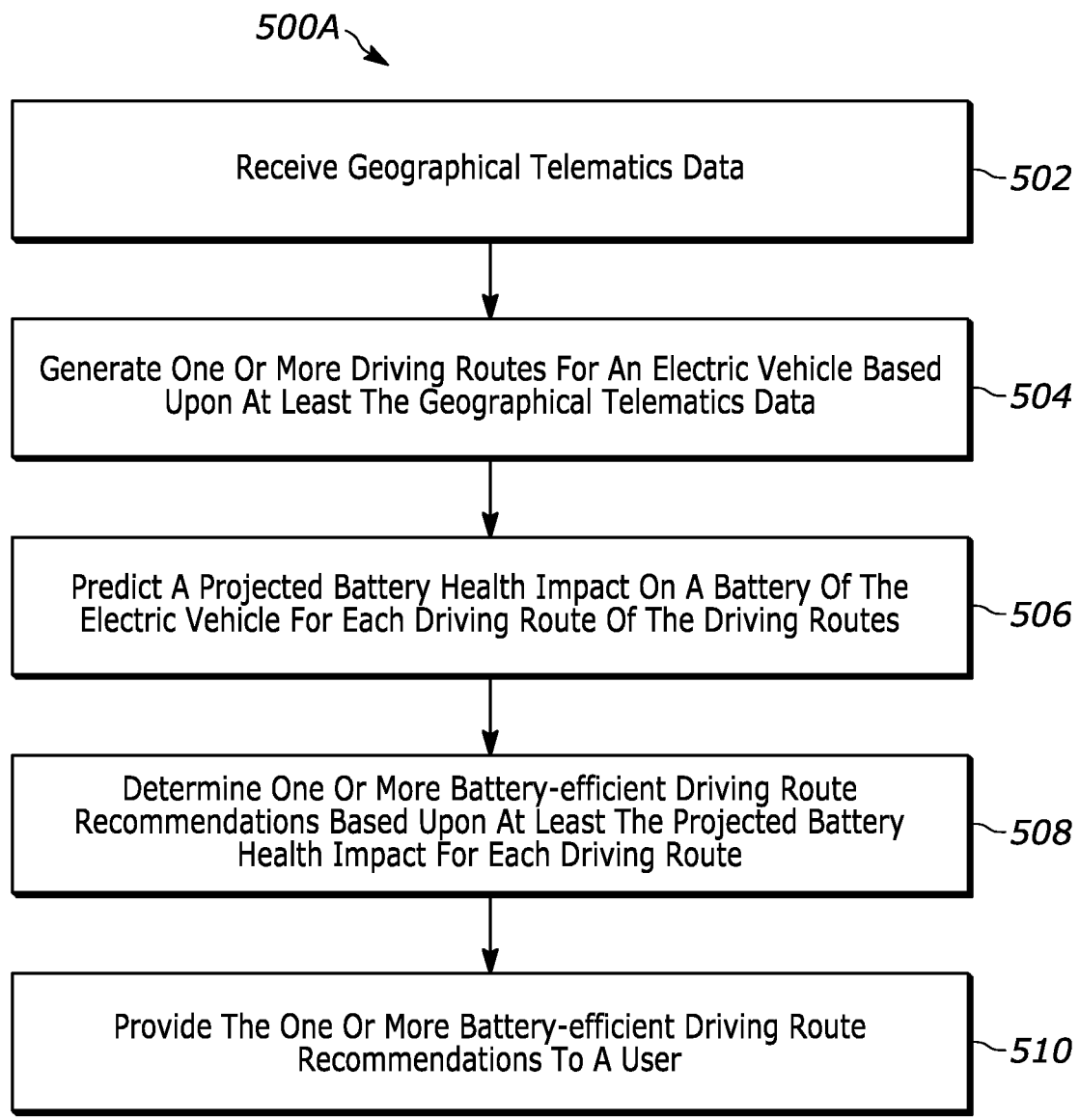
FIG. 5A depicts a flow diagram of an exemplary computer-implemented method for predicting and providing an efficient driving route for an EV based upon battery health impact, according to one embodiment.

V. Exemplary Method for Predicting and Providing an Efficient Driving Route for an Electric Vehicle FIG. 5A depicts a flow diagram of an exemplary computer-implemented method 500A for predicting and providing an efficient driving route for an EV based upon battery health impact, according to one embodiment. For clarity, the method 500A is discussed with specific reference to elements as described herein with regard to FIG. 2. However, it should be understood that, depending on the implementation, the method 500A may be implemented on other, similar components.

At block 502, the computing system 214 may receive geographical telematics data. In some implementations, the geographical telematics data may be map-based data, road data, traffic data, etc. stored on a database of the vehicle, stored on a mobile device associated with a driver of the vehicle, associated with a third party database, associated with an extended reality device (such as augmented reality or virtual reality), etc.

At block 504, the computing system 214 may generate one or more driving routes for an electric vehicle based upon at least the geographical telematics data. Depending on the implementation, the computing system 214 may generate the driving routes in response to receiving a request from a user via a user device 216. In further implementations, the computing system 214 may generate a single route and determine whether the route meets a threshold for battery efficiency or health impact at block 506 before determining whether to generate an additional route. In such implementations, the computing system 214 may loop block 504 until the computing system 214 generates a battery-efficient route recommendation.

In some implementations, the computing system 214 may generate routes depending on features of the vehicle. For example, the computing system 214 may generate longer routes for fully autonomous vehicles than for vehicles with human drivers and/or passengers.

At block 506, the computing system 214 may predict a projected battery health impact on a battery of the electric vehicle for each driving route of the driving routes. The computing system 214 may predict the projected battery health impact for a driving route based upon geographical characteristics of the particular driving route. Depending on the implementation, the geographical characteristics may include any of: the presence or lack thereof of downhill routes; the presence or lack thereof of alternatives to uphill travel; the presence or lack thereof of predicted additional braking; the presence or lack thereof of additional charging stations; the presence or lack thereof of self-charging road features, such as piezoelectric road charging or other road charging; and/or similar geographical characteristics that may affect the health of a battery.

In further implementations, the computing system 214 may predict the projected battery health impact for each driving route by analyzing each driving route using a machine learning model. Depending on the implementation, the machine learning model may be trained according to historical battery health data, historical route data, geographical telematics data, etc. The computing system 214 may then calculate the projected battery health impact for each driving route based upon the analysis of each respective driving route.

At block 508, the computing system 214 may determine one or more battery-efficient driving route recommendations based upon at least the projected battery health impact for each driving route. In some implementations, the computing system 214 may receive an indication of a preferred form of EV operation, and subsequently base the determination of the battery-efficient driving route recommendations based upon the preferred form of EV operation. Depending on the implementation, the preferred form of EV operation may be a charge efficiency mode, where driving route recommendation is focused on efficiently conserving charge and/or providing opportunities to charge the battery; a battery health efficiency mode, where driving route recommendation is focused on the long-term health of the battery; an environmental mode, where the driving route recommendation is focused on environmental impact; etc.

In further implementations, the preferred form of EV operation may be independent of a driver. For example, if an EV is a fully autonomous vehicle, the preferred form of EV operation may be or include longer routes with more battery health-related features compared to other routes due to the lack of driver. Similarly, the preferred form of EV operation may differ based upon particular time of day, car make, car model, number of passengers, type of driving (i.e., commercial transportation, delivery, or personal), etc.

Further, the battery-efficient driving route recommendations may change depending on particulars beyond the geographical characteristics of the potential driving routes. For example, the battery life may be impacted by extended exposure to heat, and therefore the time of day during which driving occurs may impact the battery-efficient driving route recommendations.

As such, in further implementations, the computing system 214 may determine the battery-efficient route based upon a predicted time of day for travel. For example, the computing system 214 may determine that a driving route including long periods of uninterrupted driving may be battery-efficient at night, but not during the day.

Similarly, the EV may include one or more autonomous or semi-autonomous features that may impact the battery health. As such, the computing system 214 may determine the battery-efficient route recommendation further based upon the presence of the one or more autonomous or semi-autonomous features. For example, the computing system 214 may determine that a route that would likely cause the autonomous or semi-autonomous features to engage and/or disengage frequently may cause an additional drain on the battery, and therefore would determine that the route in question is not a battery-efficient route. Depending on the implementation, the computing system 214 may determine the battery-efficient route recommendations using a machine learning model trained as described with regard to FIG. 2.

At block 510, the computing system 214 may provide the one or more battery-efficient driving route recommendations to a user. In some implementations, the computing system 214 may provide the route recommendations to the user via the user device 216 and the user interface 218, such as by causing the user device 216 to display the route to the user on a screen of the user device. In further implementations, the computing system 214 may provide the route recommendation to the user by transmitting the route recommendation directly to a computer 106 of the EV 212, which displays the route to the user.

In implementations in which the EV 212 has autonomous or semi-autonomous features, the computing system 214 may provide the route recommendation directly to the computer 106 of the EV 212, which begins following the route recommendation. Depending on the implementation, the computing system 214 may provide multiple route recommendations to the user, who selects the route to follow.

Figure 5B:
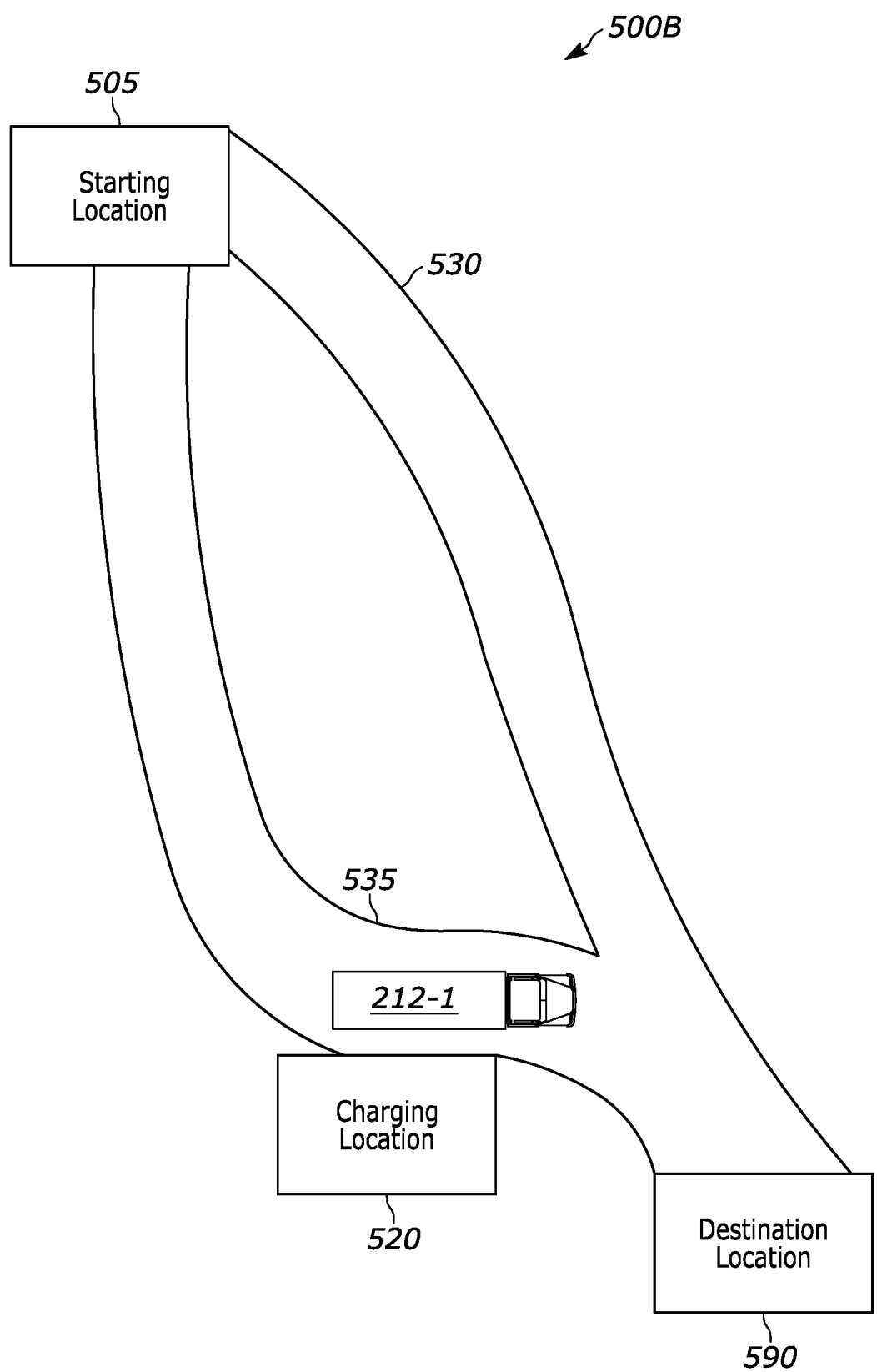
FIG. 5B depicts an example diagram for generating multiple potential routes based upon a predicted battery health impact and determining a recommendation to transmit to an EV, according to one embodiment.

FIG. 5B depicts an example scenario in which the computing system 214 may generate battery-efficient route recommendations for an EV 212-1 for a trip from EV starting location 505 to destination location 590. In the exemplary embodiment of FIG. 5B, the computing system 214 generates first battery-efficient route recommendation 530 and second battery-efficient route recommendation 535 for EV 212-1. In particular, the computing system 214 determines that route 530 is a battery-efficient route because it is the most direct and fastest route from the starting location 505 to the destination location 590. Similarly, the computing system 214 may determine that route 535 is a batter-efficient route because of the location of the charging location 520 along route 535.

The computing system 214 uses user preferences, the routes 530 and 535, geographical characteristics, and historical data as described above with regard to FIG. 5A to determine that EV 212-1 should follow route 535 to the destination location 590. The computing device 212-1 then provides the route 535 recommendation to the user. In further implementations, the computing system 214 may transmit both route recommendations, route 530 and 535, to the user as well as indications as to why each route is efficient and allow the user to decide.

VI. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

With the foregoing, an insurance customer may opt-in to a rewards, insurance discount, or other type of program. After the insurance customer provides their affirmative consent, an insurance provider remote server may collect data from the customer's mobile device, vehicle controller, or other smart devices—such as with the customer's permission or affirmative consent. The data collected may be related to electric and/or autonomous vehicle functionality, and/or insured assets before (and/or after) an insurance-related event, including those events discussed elsewhere herein. In return, risk averse insureds, drivers, or passengers may receive discounts or insurance cost savings related to home, renters, personal articles, auto, and other types of insurance from the insurance provider.

In one aspect, smart or interconnected vehicle data, and/or other data, including the types of data discussed elsewhere herein, may be collected or received by an insurance provider remote server, such as via direct or indirect wireless communication or data transmission from a vehicle computer, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) vehicle occupants.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of using route scores to assess and/or predict driving performance. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of predicting and providing an efficient driving route for an autonomous or semi-autonomous electric vehicle based upon battery health impact, the computer-implemented method comprising:
   receiving, by one or more processors, geographical telematics data;
   generating, by the one or more processors, one or more driving routes for the autonomous or semi-autonomous electric vehicle based upon at least the geographical telematics data;
   predicting, by the one or more processors, a projected battery health impact on a battery of the autonomous or semi-autonomous electric vehicle for each driving route of the one or more driving routes, wherein the projected battery health impact for each driving route is based at least upon geographical characteristics of the driving route;
   determining, by the one or more processors and based at least upon a number of people determined to be in the autonomous or semi-autonomous electric vehicle, one or more autonomous or semi-autonomous features to be used;
   determining, by the one or more processors, one or more recommendations for the autonomous or semi-autonomous electric vehicle for a battery-efficient driving route of the one or more driving routes, the one or more recommendations based upon at least the projected battery health impact for each driving route and the one or more autonomous or semi-autonomous features; and
   causing, by the one or more processors and based upon at least a corresponding projected battery health impact for a recommended route of the one or more recommendations, the autonomous or semi-autonomous electric vehicle to automatically drive along the recommended route.

2. The computer-implemented method of claim 1, wherein the geographical characteristics include at least one of: (i) presence of downhill routes; (ii) presence of alternatives to uphill travel; (iii) presence of predicted additional braking; (iv) presence of additional charging stations; or (v) presence of self-charging road features.

3. The computer-implemented method of claim 1, further comprising:
   receiving, from a user, an indication of a preferred form of electric vehicle operation;
   wherein the determining the one or more recommendations is further based upon the indication of the preferred form of electric vehicle operation.

4. The computer-implemented method of claim 3, wherein the preferred form of electric vehicle operation is at least one of: (i) a charge efficiency mode, (ii) a battery health efficiency mode, or (iii) an environmental mode.

5. The computer-implemented method of claim 1, wherein the predicting includes:
   analyzing each driving route of the one or more driving routes using a machine learning model trained using historical battery health data; and
   calculating, based upon the analyzing, the projected battery health impact for each driving route of the one or more driving routes.

6. The computer-implemented method of claim 1, wherein the determining the one or more recommendations is further based upon a predicted time of day for travel.

7. The computer-implemented method of claim 1, wherein the geographical telematics data includes at least one of: (i) map-based data stored on a database of the autonomous or semi-autonomous electric vehicle; (ii) map-based data stored on a mobile device associated with a driver of the autonomous or semi-autonomous electric vehicle; (iii) map-based data from a third party database; or (iv) road data associated with an extended reality device.

8. A computing system for predicting and providing an efficient driving route for an autonomous or semi-autonomous electric vehicle based upon battery health impact, the computing system comprising:
   a memory storing a set of computer-executable instructions; and
   one or more processors interfacing with the memory, and configured to execute the computer-executable instructions to cause the one or more processors to:
      receive geographical telematics data;
      generate one or more driving routes for the autonomous or semi-autonomous electric vehicle based upon at least the geographical telematics data;
      predict a projected battery health impact on a battery of the autonomous or semi-autonomous electric vehicle for each driving route of the one or more driving routes, wherein the projected battery health impact for each driving route is based at least upon geographical characteristics of the driving route;
      determine, based at least upon a number of people determined to be in the autonomous or semi-autonomous electric vehicle, one or more autonomous or semi-autonomous features to be used;
      determine one or more recommendations for the autonomous or semi-autonomous electric vehicle for a battery-efficient driving route of the one or more driving routes, the one or more recommendations based upon at least the projected battery health impact for each driving route and the one or more autonomous or semi-autonomous features; and
      cause, based upon at least a corresponding projected battery health impact for a recommended route of the one or more recommendations, the autonomous or semi-autonomous electric vehicle to automatically drive along the recommended route.

9. The computing system of claim 8, wherein the geographical characteristics include at least one of: (i) presence of downhill routes; (ii) presence of alternatives to uphill travel; (iii) presence of predicted additional braking; (iv) presence of additional charging stations; or (v) presence of self-charging road features.

10. The computing system of claim 8, wherein the memory further stores instructions that, when executed by the one or more processors, cause the one or more processors to:
    receive, from a user, an indication of a preferred form of electric vehicle operation;
    further wherein determining the one or more recommendations is further based upon the indication of the preferred form of electric vehicle operation.

11. The computing system of claim 10, wherein the preferred form of electric vehicle operation is at least one of: (i) a charge efficiency mode, (ii) a battery health efficiency mode, or (iii) an environmental mode.

12. The computing system of claim 8, wherein predicting the projected battery health impact includes:
    analyzing each driving route of the one or more driving routes using a machine learning model trained using historical battery health data; and calculating, based upon the analyzing, the projected battery health impact for each driving route of the one or more driving routes.

13. The computing system of claim 8, wherein determining the one or more recommendations is further based upon a predicted time of day for travel.

14. The computing system of claim 8, wherein the geographical telematics data includes at least one of: (i) map-based data stored on a database of the autonomous or semi-autonomous electric vehicle; (ii) map-based data stored on a mobile device associated with a driver of the autonomous or semi-autonomous electric vehicle; (iii) map-based data from a third party database; or (iv) road data associated with an extended reality device.

15. A tangible, non-transitory computer-readable medium storing instructions for predicting and providing an efficient driving route for an autonomous or semi-autonomous electric vehicle based upon battery health impact that, when executed by one or more processors of a computing device, cause the computing device to:
  receive geographical telematics data;
  generate one or more driving routes for the autonomous or semi-autonomous electric vehicle based upon at least the geographical telematics data;
  predict a projected battery health impact on a battery of the autonomous or semi-autonomous electric vehicle for each driving route of the one or more driving routes, wherein the projected battery health impact for each driving route is based at least upon geographical characteristics of the driving route;
  determine, based at least upon a number of people determined to be in the autonomous or semi-autonomous electric vehicle, one or more autonomous or semi-autonomous features to be used;
  determine one or more recommendations for the autonomous or semi-autonomous electric vehicle for a battery-efficient driving route of the one or more driving routes, the one or more recommendations based upon at least the projected battery health impact for each driving route; and
  cause, based upon at least a corresponding projected battery health impact for a recommended route of the one or more recommendations, the autonomous or semi-autonomous electric vehicle to automatically drive along the recommended route.

16. The tangible, non-transitory computer-readable medium of claim 15, wherein the geographical characteristics include at least one of: (i) presence of downhill routes; (ii) presence of alternatives to uphill travel; (iii) presence of predicted additional braking; (iv) presence of additional charging stations; or (v) presence of self-charging road features.

17. The tangible, non-transitory computer-readable medium of claim 15, wherein the tangible, non-transitory computer-readable medium further includes instructions that, when executed by the one or more processors, cause the computing device to:
  receive, from a user, an indication of a preferred form of electric vehicle operation;
  wherein determining the one or more recommendations is further based upon the indication of the preferred form of electric vehicle operation.

18. The tangible, non-transitory computer-readable medium of claim 15, wherein predicting the projected battery health impact includes:
  analyzing each driving route of the one or more driving routes using a machine learning model trained using historical battery health data; and
  calculating, based upon the analyzing, the projected battery health impact for each route of the one or more driving routes.

* * * * *